March 23, 1948. F. C. POYNER 2,438,128
LUBRICATION ADAPTER
Filed Feb. 4, 1946
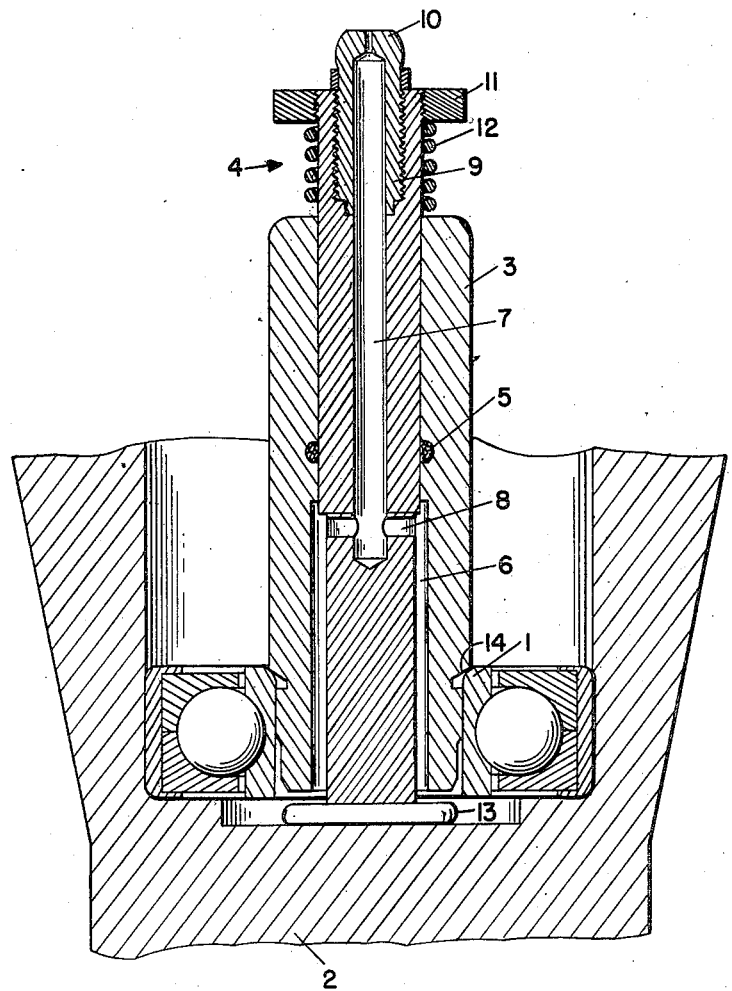
INVENTOR
FRANK C. POYNER
BY *M. C. Hayes*
ATTORNEY

UNITED STATES PATENT OFFICE 2,438,128

LUBRICATION ADAPTER

Frank C. Poyner, San Diego, Calif.

Application February 4, 1946, Serial No. 645,423

4 Claims. (Cl. 184—1)

(Granted under the act of March 3, 1883, as amended April 30, 1928; 370 O. G. 757)

This invention relates to a lubrication adapter, and more particularly to an adapter for use in transmitting a lubricant under pressure from a grease gun to an otherwise inaccessible part which is to be lubricated.

It is an object of this invention to provide an improved adapter for use with apparatus supplying a lubricant under pressure.

A further object is to provide an adapter useful in transmitting a lubricant under pressure from a grease gun to an otherwise inaccessible part which is to be lubricated.

In accomplishing these and other objects of the present invention, I have provided improved details of structure, the preferred form of which is illustrated in the accompanying drawing, wherein:

The single figure is a view in vertical cross-section of an adapter embodying the features of the present invention, and of a bearing to be lubricated mounted within a housing.

Referring more in detail to the drawing:

Shown at 1 is a bearing of the ball type which is to be lubricated with a grease. This bearing is fitted within a housing 2. Resting on the housing 2 and against the upper, inner, peripheral surface of the bearing, is the lubrication adapter with which this invention is concerned. It comprises a tubular housing or casing 3 of somewhat greater length than the casing and a plunger 4 reciprocably mounted therein. The bore of what may be termed the upper portion of the casing is smaller than that of the counterbored lower portion, and fits closely about the adjacent plunger surfaces. A packing ring 5 is provided between the casing and the plunger to insure a fluid-tight seal therebetween. A space 6 is provided between the lower, or counterbored, portion of the casing and the plunger.

The plunger is axially bored at 7 to permit the passage therethrough of the lubricant, and is radially bored at 8 to provide ports through which the lubricant may pass from the bore 7 into the space 6.

The upper end of the plunger, as viewed in the drawing, is threaded both internally and externally. An axially bored fitting 9, threadably engaged with the interior threads on the plunger, has an end portion 10 shaped for cooperable engagement with a nozzle of a grease gun (not shown). A nut 11 engages the exterior threads on the plunger, and serves to retain a compression spring 12 which is positioned about the upper end of the plunger and abuts against the upper end of the casing 3, the spring 12 thereby serving to retract the plunger to its uppermost position as regards the casing.

The lower portion of the plunger has an enlarged, circular head 13 formed integral therewith, the plunger head abutting against the lower end of the casing 3 and acting to close the counterbore therein.

The outer surface of the casing is inwardly tapered at 14 to provide an annular shoulder and the said tapered surface engages the upper peripheral portion of the inner surface of the bearing 1.

*Operation*

The operation of an adapter constructed as described above is as follows:

The adapter is positioned with its end portion within the bearing in the manner shown in the drawing with the tapered surface 14 of the casing 3 engaging the upper surface of the bearing 1. A grease gun (not shown) is then brought into position against the end 10 of fitting 9, and the plunger 4 is pushed downwardly until the lower end thereof abuts firmly against the housing 2. Grease is then forced downwardly through the adapter and is discharged through the aperture between the casing 3 and the head 13. It then travels into the bearing, thereby lubricating the same. The grease is prevented from passing above the bearing without first passing through the same by reason of the seal effected between the bearing and the tapered surface 14 of the casing, while grease is prevented from piling up ahead of the adapter by reason of the close contact made by the bottom of the plunger and the underlying surface of the housing, and the fact that the grease is released at points slightly above the bottom of the adapter.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A lubricant injector for annular bearings including, a cylindrical housing having a reduced end portion for engaging within the bore of an annular bearing, a tapered shoulder formed externally of the housing contiguous to its reduced end portion for engaging the inner peripheral margin of the bearing so as to seal the bore thereof, said housing having an axial bore extending throughout the length thereof, the portion of the housing bore adjacent the reduced end portion of the housing being enlarged to provide a counterbore, a cylindrical plunger having a snug sliding fit within said housing bore and of greater length than the housing so as to project beyond the ends thereof, means within the housing bore for sealing off around the plunger, a circular head formed on one end of said plunger for engaging the reduced end of said housing and closing the counterbore, a nut screw-threaded upon the opposite end of the plunger, and a compression spring confined upon said plunger between the nut and the adjacent housing end for resiliently maintaining the plunger head in engagement with the reduced housing end, the plunger having an axial bore extending from its screw-threaded end to a point substantially midway of its length, said plunger having radial ports for establishing communication between the inner end of said axial bore and the housing counterbore, and a lubricant fitting screw-threaded in the outer end of said bore, the fitting having an axial bore for receiving lubricant and communicating with the bore in the plunger whereby the plunger head is forced away from the adjacent housing end by the pressure of the lubricant to permit the passage of said lubricant to the bearing.

2. An adapter for transmitting a lubricant under pressure, comprising, a cylindrical casing having a smaller bore along one portion than along the remaining portion thereof; a plunger resiliently reciprocably mounted within said casing, the plunger walls engaging the casing walls along the portion of the latter having the smaller bore and being spaced from the casing walls along the portion of larger bore, said plunger having an end portion shaped for cooperable engagement with apparatus supplying said lubricant under pressure, and having an opening extending therethrough from said end portion into the space between said plunger and said casing.

3. An adapter comprising, a casing having a portion engageable with a device to be lubricated in sealing relation thereto, a plunger resiliently reciprocably mounted in the casing having a lubricant inlet fitting, said plunger and casing having cooperative passages communicating the plunger inlet fitting with the device to be lubricated within the sealed portions thereof, and means normally closing said passages, said means being responsive to applied lubricant pressure to allow passage of lubricant to said device.

4. An adapter comprising, a casing having a portion engageable with a device to be lubricated in sealing relation thereto, a plunger reciprocably mounted in the casing having an end shaped for cooperable engagement with apparatus supplying a lubricant under pressure, said casing and said plunger having cooperative passages communicating the said shaped end with the device to be lubricated within the sealed portions thereof.

FRANK C. POYNER.

REFERENCES CITED

The following references are of record in the file of this patent:

UNITED STATES PATENTS

| Number | Name | Date |
|---|---|---|
| 2,137,659 | Welke | Nov. 22, 1938 |
| 2,210,478 | Berg | Aug. 6, 1940 |
| 2,270,754 | Ginter | Jan. 20, 1942 |
| 2,309,820 | Berg | Feb. 2, 1943 |